(12) United States Patent
Gomes

(10) Patent No.: US 12,210,634 B2
(45) Date of Patent: Jan. 28, 2025

(54) FEATURELESS MACHINE ENHANCEMENT DISCOVERY AND VERIFICATION

(71) Applicant: INTERNATIONAL BUSINESS MACHINES CORPORATION, Armonk, NY (US)

(72) Inventor: Louis P. Gomes, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 586 days.

(21) Appl. No.: 17/451,866

(22) Filed: Oct. 22, 2021

(65) Prior Publication Data

US 2023/0131198 A1  Apr. 27, 2023

(51) Int. Cl.
| | |
|---|---|
| *H04L 29/06* | (2006.01) |
| *G06F 9/455* | (2018.01) |
| *G06F 11/07* | (2006.01) |
| *G06F 21/60* | (2013.01) |
| *G06F 21/62* | (2013.01) |
| *G06F 21/78* | (2013.01) |

(52) U.S. Cl.
CPC ........ *G06F 21/602* (2013.01); *G06F 9/45558* (2013.01); *G06F 11/0772* (2013.01); *G06F 21/6236* (2013.01); *G06F 21/78* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 8,498,418 B2 * | 7/2013 | Meissner | G06F 21/602 380/278 |
| 8,930,603 B2 * | 1/2015 | Gainey, Jr. | G06F 13/24 710/52 |
| 9,355,163 B2 * | 5/2016 | Soundararajan | G06F 16/28 |

(Continued)

OTHER PUBLICATIONS

ABBAS, "Enhancement of the Capabilities of CNC Machines via the Addition of a New Counter boring Cycle with a Milling Cutter," Mechanical Engineering Research, Oct. 2015, pp. 45-58, vol. 5, No. 2, ISSN 1927-0607, DOI: 10.5539/mer.v5n2p45, Retrieved from the Internet: <URL: http://dx.doi.org/10.5539/mer.v5n2p45>.

(Continued)

*Primary Examiner* — Maung T Lwin
(74) *Attorney, Agent, or Firm* — Teddi E Maranzano

(57) ABSTRACT

Method, computer program product, and computer system are provided. Program queries for an indicator of dependency between a usage domain and a control domain in a virtual machine (VM) configuration having a cryptographic AP adapter. The VM and the cryptographic AP adapter are both installed on a hardware server. Program sets an internal bitmap based on a result and generates one or more sets of AP commands, based on the setting of the internal bitmap. The sets of AP commands are directed to an adjunct processor (AP) message queue on a cryptographic AP in the VM configuration. Program enqueues the one or more sets of program instructions to the VM having an identifier corresponding to an offset in the program internal bitmap. Program receives status at completion of the one or more sets of AP commands from the VM having the cryptographic AP in the VM configuration.

20 Claims, 6 Drawing Sheets

(56) References Cited

U.S. PATENT DOCUMENTS

| | | | |
|---|---|---|---|
| 9,565,512 B2 | 2/2017 | Rhoads | |
| 9,680,808 B2 * | 6/2017 | Cignetti | H04L 63/061 |
| 10,103,918 B2 | 10/2018 | Terry | |
| 10,318,881 B2 | 6/2019 | Rose | |
| 10,585,730 B1 * | 3/2020 | Gomes | G06F 9/526 |
| 2007/0288921 A1 * | 12/2007 | King | G06F 9/45537 |
| | | | 718/1 |
| 2020/0036602 A1 * | 1/2020 | Leibovici | G06F 3/0605 |

OTHER PUBLICATIONS

Disclosed Anonymously, "Accelerated discovery of table relationships," IP.com, Dec. 8, 2015, 8 pages, IP.com No. IPCOM000244380D.

Disclosed Anonymously, "Automating last-mile power connection discovery in datacenters," IP.com, Jan. 15, 2019, 9 pages, IP.com No. IPCOM000257126D.

Disclosed Anonymously, "Datastructure for defining a device's interface and functionality in an M2M environment and Mechanism for verifying a device's functionality in an M2M environment," IP.com, Feb. 13, 2014, 17 pages, IP.com No. IPCOM000234906D.

Sayuti, et al., Enhancement and verification of a machined surface quality for glass milling operation using CBN grinding tool-Taguchi approach, The International Journal of Advanced Manufacturing Technology, Jun. 2012, 5 pages, vol. 60, DOI: 10.1007/s00170-011-3657-z, Retrieved from the Internet: <URL: https://www.researchgate.net/publication/256326692_Enhancement_and_verification_of_a_machined_surface_quality_for_glass_milling_operation_using_CBN_grinding_tool-Taguchi_approach/citation/download>.

* cited by examiner

FEATURELESS MACHINE ENHANCEMENT DISCOVERY AND VERIFICATION

BACKGROUND

The present invention relates to computer systems, and more specifically to discovering and verifying featureless machine enhancements.

When a new enhancement is architected in a computer, a new feature bit that controls the new enhancement is also architected. However, if the new enhancement is small, the feature bit may not be architected. In that case, the computer's controlling software, for example the operating system or hypervisor (the program), uses other architected means to discover the addition of the new enhancement.

The adjunct processor (AP) cryptographic (crypto) card defines control domains for administrative work and usage domains for functional work. An AP domain mask tracks the settings for each type of domain per card. In some implementations, both a control domain and a usage domain are required for some AP commands. In other implementations, enabling both types of domains is not required. In addition to relaxing this requirement, this enhancement provides for backward compatibility.

It would be advantageous to efficiently determine the control domain and usage domain settings.

SUMMARY

A method is provided. A program, such as an application or an operating system, queries for an indicator of a dependency between a usage domain and a control domain in a virtual machine (VM) configuration having a cryptographic AP adapter. The VM and the cryptographic AP adapter are both installed on a hardware server. A program sets an internal bitmap based on a result. The program generates one or more sets of AP commands, based on the setting of the internal bitmap. The sets of AP commands are directed to an adjunct processor (AP) message queue on a cryptographic AP in the VM configuration. The program enqueues the one or more sets of AP commands to the VM having an identifier corresponding to an offset in the program internal bitmap. The program receives a status at a completion of the one or more sets of AP commands from the VM having the cryptographic AP in the VM configuration.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
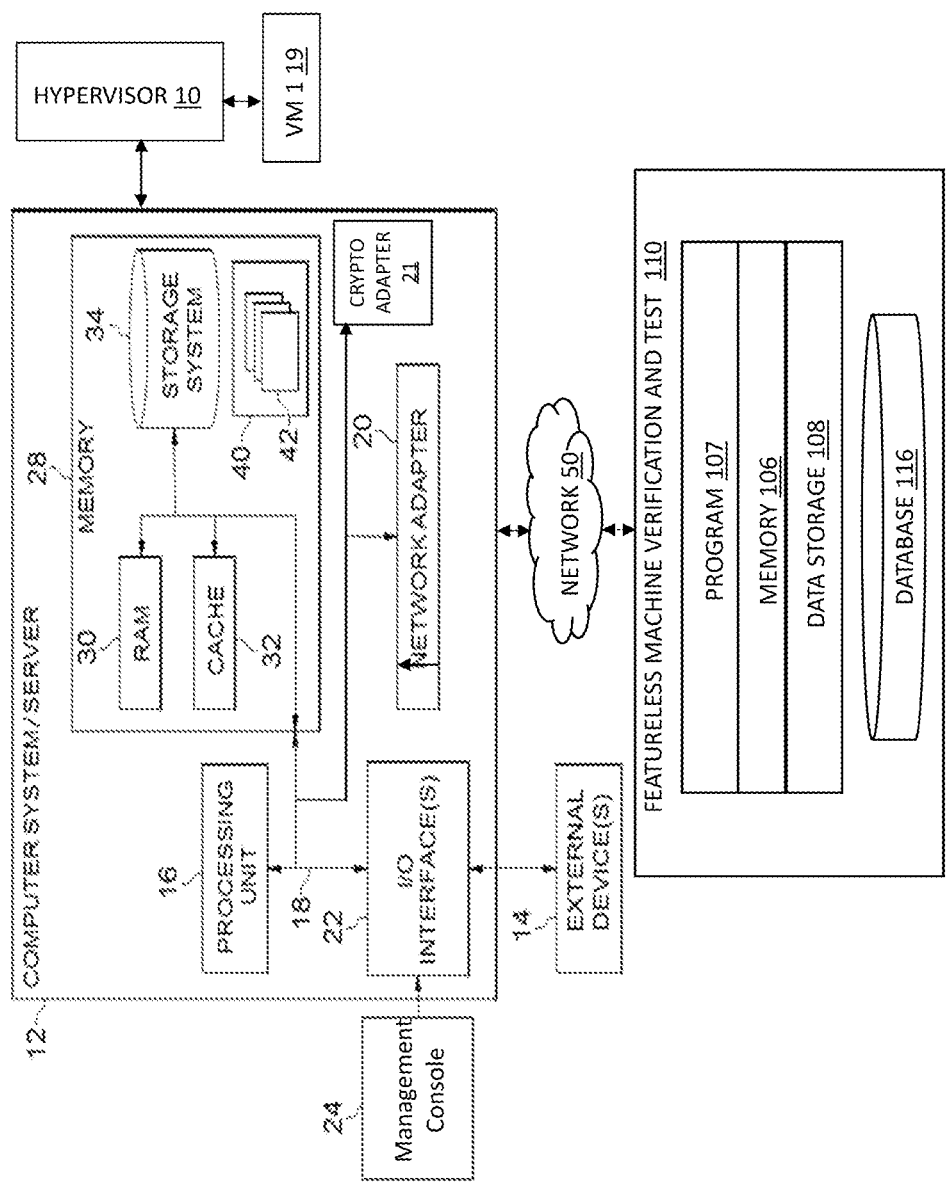
FIG. 1 depicts one example of a computing environment to incorporate and use one or more aspects of the present invention.

A cluster of hypervisors (systems) is established to provide physical machine capabilities to one or more virtual machines (VM). Each of the hypervisors executes on a computer and has available to it all of the functions and facilities (also referred to herein collectively as "resources") of the computer on which it is executing. The resources include software instructions, machine code instructions, microcode and millicode instructions, and/or physical hardware capabilities, including one or more Cryptographic Express PCIe (CEX) AP crypto adapters. The hypervisors expose a set of the resources to the VMs and provide a mechanism for ensuring that operations and modifications of the VMs occur in a controlled and predictable manner.

Embodiments of the present invention may be implemented on computer hardware and software that support VMs that are configured with AP crypto adapters. Here, the contexts of z/VM® and z/Architecture® are used to facilitate understanding of the elements of the present invention. (z/VM® and z/Architecture® are registered trademarks of IBM in the United States).

Conceptually, an AP crypto adapter is assigned a unique number, which is its adjunct processor number (APn 0-255). Within each APn there may be assigned up to 256 logically independent processing facilities known as domains. The APn and Domain number pair uniquely identifies an AP crypto resource with which to process work. Each such pair is served by a work queue which may comprise up to 32 elements, with each element containing at most one request message or its corresponding reply message. The number of APn and elements are exemplary, and may vary to include more or fewer, depending on the architectural implementation. Each such queue is known as an AP queue (APQ) and is uniquely identified by the APn and Domain number of the resource it serves. The concatenated AP and Domain numbers may be referred to as the AP queue number (APQN). The APQNs may be externally configured and reset from an administrative console, also referred to as a hardware management console (HMC), without synchronous information being sent to the program of the event.

When a new enhancement is architected in the computer hardware, a new facility bit to control the new enhancement may also be architected to let the computer's controlling software, such as the hypervisor and operating system know the new enhancement is available on the new machine model. However, not all new facilities may have a corresponding facility bit. This is because the number of unused facility bits may be limited and may therefore be reserved for major enhancements. In that case, the computer's controlling software, uses other architected means to discover the addition of the new enhancement and its availability for use or for performing architecture verification tests.

The AP crypto architecture defines control domains as a subset of the usage domains. A logical partition's control domains are those cryptographic domains for which remote secure administration functions can be established and administered from this logical partition.

Functional AP commands are issued and executed through the usage domains, but administrative AP commands are issued and executed through the control domains. The usage domain AP Queue Mask (AQM) field contains a bitmap of usage domains and AP Domain Mask (ADM) field contains a bitmap of control domains.

In some hardware models, the AP crypto architecture requires the configuration of a corresponding usage domain if a control domain is configured. As a result, a machine operator cannot enable a control domain without enabling the corresponding usage domain. However, it is not necessary to have such a dependency between a control domain and a usage domain because the type of work performed on the AP crypto card is segregated by domain type. Also, one may not want the functional operator or programmer, for example, to perform administrative work. This is because administrative work may include destructive alterations to the domain state, for example, by altering security master keys. Thus, control domains are carefully defined when administrative work is required. For added security and to prevent unauthorized domain state change, altering the domain state may require digital signatures of multiple security officers.

In other models, the requirement that each enabled control domain have a corresponding usage domain enabled may be relaxed or removed. In order to provide compatibility between these two AP crypto architectures, the QCI (query configuration information) function of the PQAP (Process Queue Adjunct Processor) privileged instruction returns configuration and operational status information about the APQN. The AP queue index (APEX) of the AP queue is used as an index into the AQM and ADM bitmaps to locate a usage domain bit and the corresponding control domain bit. The caller that issued the PQAP instruction can examine the returned bitmaps to determine, by the bit settings whether this APQN requires both the AQM and ADM bits, or only the AQM bit or only the ADM bit. The bitmaps may be returned in one of the general purpose register operands used.

NQAP (Enqueue Adjunct Processor) places a request message on an addressed APQN. Status information is returned in the adjunct processor AP queue status word (APQSW) to indicate the success of the request. Once the request is placed on the APQN, the NQAP instruction completes and the message request is processed asynchronously. A work request may be delivered as a number of segments, each requiring separate NQAP instructions. Where multiple segments are needed, the instruction returns the AP queue index or entry number (APEX) on successfully receiving the first segment. Subsequent segments require that the associated APEX be specified with the request. When an entire message is assembled, the AP crypto adapter is able to process it. Segmenting may occur at the instigation of either the program or the machine.

It would be advantageous to provide an enhanced method of discovering and verifying the presence of the featureless machine enhancement. In general, the program queries the AP crypto configuration of the APQN. Using the returned configuration information, the program may set its internal configuration settings for the APQN, i.e., only control domain enabled feature, only usage domain enabled feature, or both usage and control domain feature enabled. The program may then generate a test stream by building one or more test cases based on the saved internal configuration settings and execute the test stream on the machine model. By saving the returned configuration information, only one query of the AP crypto configuration of the APQN is needed, which tends to reduce demand on the machine resources. This method of saving returned configuration information may be used by a user program and the operating system/hypervisor, in addition to the test verification program.

Referring now to the figures, FIG. 1 depicts one example of a computing environment to incorporate and use one or more aspects of the present invention.

As shown, the system 100 includes one or more computer system/servers (server) 12, one of which is shown. The system 100 further includes a featureless machine verification and test system 110 that communicates with the server 12 over the network 50. The server 12 may include any computer capable of including a hypervisor 10, which enables virtualizing the server 12 hardware to support one or more optional virtual guests, such as VM1 19.

The functions and processes of server 12 may be described in the context of computer system-executable instructions, such as program modules, routines, objects, data structures, and logic, etc. that perform particular tasks or implement particular abstract data types. The server 12 can be part of a distributed cloud computing environment, and may enable creation of multiple VMs, when a hypervisor 10 is installed on the server 12.

As shown in FIG. 1, the server 12 may include, but is not limited to, one or more processors or processing units 16, a system memory 28, and a bus 18 that couples various system components including system memory 28 to processor 16.

Bus 18 represents one or more of several types of bus structures, including a memory bus or memory controller, a peripheral bus, an accelerated graphics port, and a processor or local bus using any of a variety of bus architectures.

The server 12 typically includes a variety of computer system readable media. Such media may be any available media that is accessible by computer system/server 12, and it includes both volatile and non-volatile media, removable and non-removable media.

The memory 28 can include computer system readable media in the form of volatile memory, such as random access memory (RAM) 30 and/or cache memory 32. The memory 28 may include a hardware system area, which is indirectly accessible and not visible to programs executing on the processor 16. Here, indirectly accessible is used to mean that the hardware system area and the adjunct processor queue(s) stored in the hardware system area are only accessible by specific limited instructions and not otherwise accessible (e.g., cannot load into it, programs are unaware of addresses, etc.). Located within the memory 28 are one or more adjunct processor queues. These queues are not directly visible from user programs and are instead considered a part of the processor 16, memory 28, and adjunct processor(s) (crypto adapter 21).

A processor 16 has access to the queues in memory 28 by, for instance, issuing instructions to place requests on the queue, and/or to remove replies from the queue. The adjunct processor has direct access to the queues via a transport layer and takes requests off the queue, processes the requests, and places replies to the requests on the queue. Therefore, the message flow may comprise the program issuing AP instructions to a queue that is actually in the hardware system area. The transport layer firmware validates a request to the extent possibly within the constraints of performing real I/O to the bus connected to the crypto adapter 21 and sends the request to the firmware on the crypto adapter 21.

The server 12 may further include other removable/non-removable, volatile/non-volatile computer system storage media. For example, storage system 34 can include a non-removable, non-volatile magnetic media, e.g., a "hard drive" and an optical disk drive for reading from or writing to a removable, non-volatile optical disk such as a CD-ROM, DVD-ROM or other optical media. Each device in the storage system 34 can be connected to bus 18 by one or more data media interfaces, such as I/O interface 22.

Each program 40 represents one of a plurality of programs that are stored in the storage system 34 and are loaded into the memory 28 for execution. A program 40 includes an instance of an operating system, an application, a system utility, or similar. Each program 40 includes one or more modules 42. Upon activation of the VMs, the hypervisor 10 can cause the profiles of the various VMs to load into hypervisor 10 memory, where they populate the configuration parameters and resources of the VMs. It should be noted that even when the server 12 includes the hypervisor 10, a VM is not required. In that case, the physical resources of the server 12 are not virtualized.

The server 12 may also communicate with one or more external devices 14 such as a keyboard, a pointing device; and/or any devices (e.g., network card, modem, etc.) that enable the server 12 to communicate with one or more other computing devices. Such communication can occur via Input/Output (I/O) interfaces 22.

The management console 24, includes specialized software to communicate with the hypervisor 10 component of the server 12 through the I/O interface 22 to manage the configuration and state of VMs. Using the management console 24 an administrator having the appropriate security authorization defines and modifies VMs, assigns servers to domains and subdomains, and assigns hardware, particularly cryptographic adapters (21) to servers and VMs. The administrator may also define control domains and usage domains for VMs and execute administrative AP commands and functional AP commands through the usage domains through the control domains of the AP crypto adapters 21, where the respective domains are enabled.

The server 12 can communicate with one or more networks via network adapter 20. As depicted, network adapter 20 communicates with the other components of the server 12 via bus 18. Although not shown, other hardware and/or software components could be used in conjunction with the server 12. Examples include, but are not limited to: microcode, device drivers, redundant processing units, external disk drive arrays, RAID systems, tape drives, and data archival storage systems. In the present invention, the server 12 can illustrate a physical hardware and software implementation. The server 12 can also illustrate a virtual implementation of a physical server, for example, a VM.

The featureless machine verification and test (test) server 110 is configured to exercise the various configurations of the control and usage domain bit settings to ensure the features operate as architected. The test server 110 may be a separate workstation, server, or a virtual machine partition on a server. The program 107 generates the various tests, based on the features found in the target server 12.

As part of the test initialization, the program 107 may be loaded in the test server 110 memory 106. For example, the program may begin by issuing the PQAP QCI request to the target server to retrieve the bitmap of the usage domains and the bitmap of the control domains have a control domain and/or a usage domain enabled. The program scans both bitmaps in parallel starting at index "0". If both bits are on, then there is at least one domain with both the control and usage feature bits enabled, and the test server 110 may note in its internal storage 108 that this feature has been identified. The next index, "1", is checked. If only the usage bit enabled and control bit not enabled, then there is at least one domain with only a usage domain enabled, and this may be noted in the test server 110 internal storage 108. For the next index, "2", both are on, but this feature is already noted, and no action is needed. For index "3" the usage domain is enabled, which was already noted. Next, for index "4" only the control domain enabled. The initialization process recognizes that all three features are found, and no further scanning of the returned bitmaps is needed.

Upon receipt of the test response from the server 12, the program 107 may evaluate the results and report accordingly to an administrator, programmer, or other qualified professional. The tests and test results may be stored in the database 116.

While the test server 110 is shown communicating with a physical server 12, other configurations are possible. For example, the test server 110 may transmit test cases to an emulator or simulator. To the test server 110, the communication with the emulator or simulator can be indistinguishable from communication with the server 12. This allows testing to occur during a development cycle when the target hardware is not yet available for full testing.

Although specific fields, locations of fields, sizes of fields, bits and values of fields or bits are described in one embodiment herein for the Process Adjunct Processor Queue instruction and its associated registers, other fields, locations of fields, sizes of fields, bits and/or values of fields or bits may be used without departing from a spirit of one or more aspects of the invention. Fields and/or bits of each of the general registers not described herein may be blank, have a predefined value (e.g., zero), and/or include values to be ignored in one embodiment. Many possibilities exist.

Figure 2:
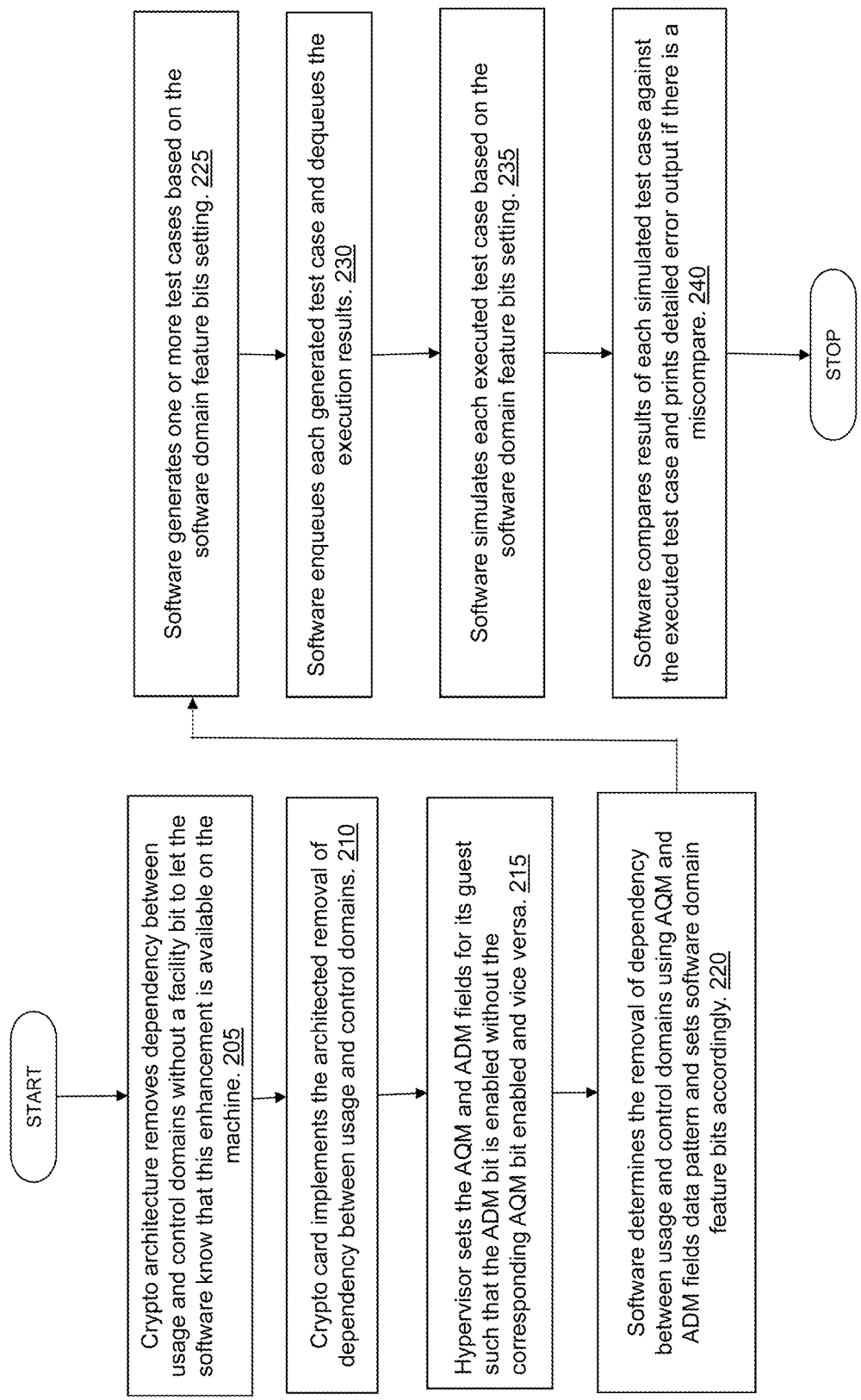
FIG. 2 illustrates a flow of featureless machine enhancement discovery and verification, according to one or more aspects of the present invention.

Turning now to FIG. 2, a flow of featureless machine enhancement discovery and verification is illustrated, according to one or more aspects of the present invention.

The process begins at 205, at the initial installation of the server hardware. Depending on the machine model, during the installation, the various levels of firmware and microcode interrogate the hardware to discover the hardware's capabilities. If, as a result of the interrogation, the machine model is eligible, the crypto architecture removes the dependency between the usage and control domains but does not set a facility bit to inform the software that this enhancement is available on the machine. As discussed above, depending on the type of feature, not every facility has an associated facility bit. In this example, the software includes the hypervisor 10. As the machine enters service, the software also includes application programs and operating systems.

At 210, the firmware of the AP crypto card adapter is notified to remove the dependency between usage and control domains.

At 215, the hypervisor 10, sets the AQM and ADM fields for the guest such that the enablement of the ADM is independent of the enablement of the AQM.

At 220, program, i.e., application program, or operating system, queries the AQM and ADM fields data pattern for the removal of the dependency between usage and control domains. The software sets software domain feature bits accordingly.

At 225 the software (program) generates one or more test cases based on the software domain feature bits setting. In this context the program is an example of a test verification program. However, an application program, operating system, or similar software, can similarly use its internal feature map to perform its logic.

At 230 the program executes the NQAP instruction to enqueue the test case into the selected AP queue. The NQAP (Enqueue Adjunct Processor) places a request message on an addressed AP queue that corresponds to the selected APQN. Status information is returned in the adjunct processor AP queue status word (APQSW) to indicate the success of the request. The requests are delivered to an internal queue in the computer's hardware system area. A separate piece of computer firmware processes that queue. Following validation, the request is sent to firmware on the AP crypto card, which routes the request to the AP crypto card's crypto chip, or one of the crypto chip's agents. Once the request is placed on the AP queue, the NQAP instruction completes, and the AP crypto adapter processes the message request asynchronously. A work request may be delivered as a number of segments, each requiring separate NQAP instructions. Where multiple segments are needed, the instruction returns the AP queue index or entry number (APEX) on successfully receiving the first segment. Subsequent segments require that the associated APEX be specified with the request. When an entire message is assembled, the AP crypto adapter is able to be process it. Segmenting may occur at the instigation of either the program or the machine.

Continuing at 230, the DQAP (Dequeue Adjunct Processor) removes the next ready reply message from the addressed AP queue that corresponds to the selected APQN. Status information is returned in the APQSW to indicate the success of the reply. Once a reply has been successfully removed, the associated queue element of the AP queue becomes free to be used for a subsequent request. Replies may be returned in multiple segments, each requiring a separate DQAP to receive each segment. The first DQAP returns the APEX, which each subsequent DQAP specifies to retrieve the remaining message segments.

At 235, the test system 110 executes in simulation the test case that was previously executed on the server 12. Alternatively, the test program may call its own test case simulator and generate the architected test case results.

At 240, the program compares the test results from the execution on the server 12 to that executed in simulation. A detailed report of the results is output, which can include a printed report, a log record, or an alert to the administrator.

Figure 3:
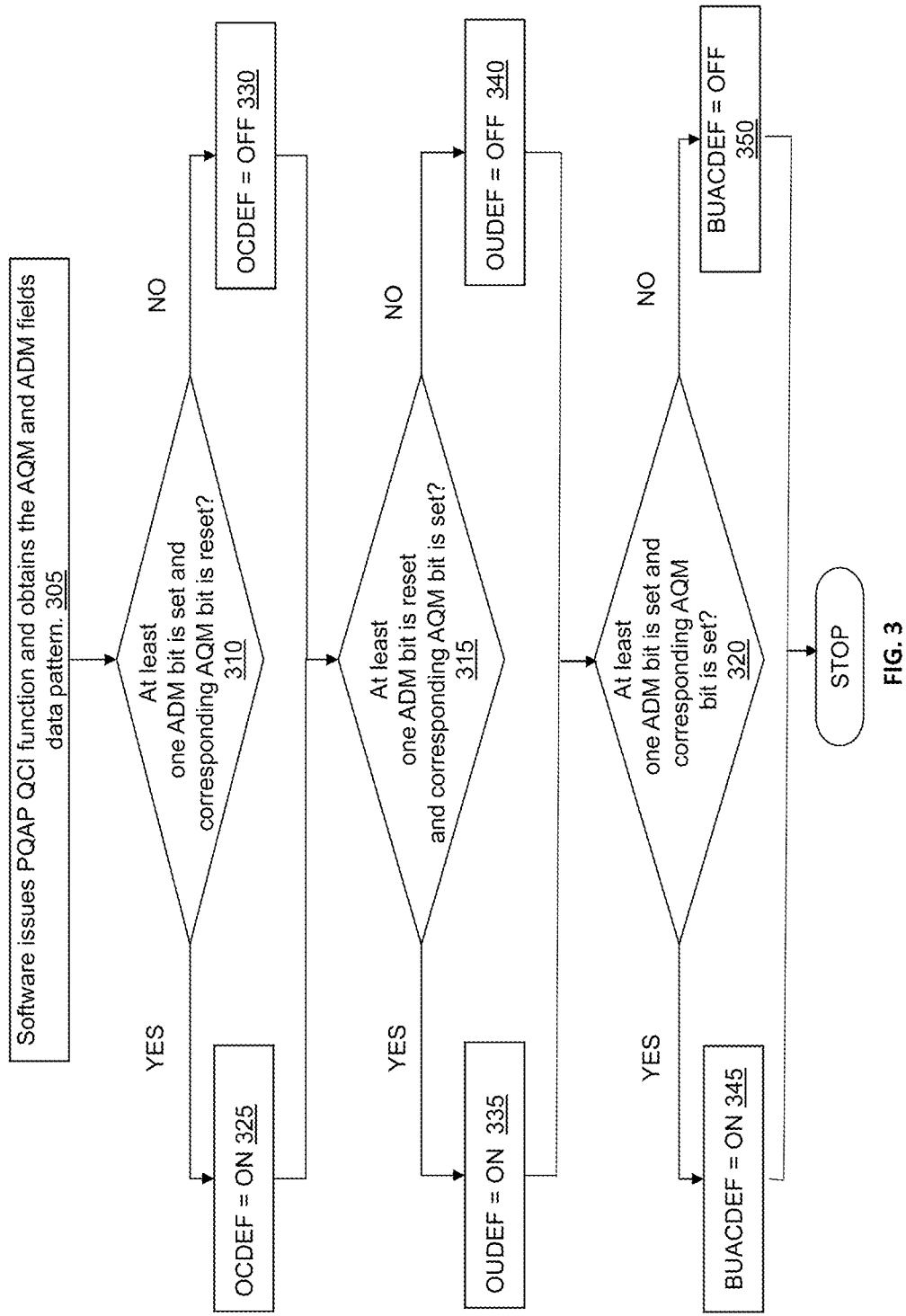
FIG. 3 illustrates a flow of setting software domain feature bits based on control and usage fields data pattern, according to one or more aspects of the present invention.

FIG. 3 illustrates a more detailed flow of 220 of FIG. 2, setting software domain feature bits based on control and usage fields data patterns.

At 305, the program issues the PQAP QCI request to the target server to retrieve the bitmap of the usage domains (AQM) and the bitmap of the control domains (ADM) of all the AP crypto cards that are in the current configuration. The program can scan both bitmaps in parallel starting at index "0".

At 310, if the program finds at least one ADM bit is set (enabled) but the corresponding AQM bit is not set (disabled) then at 325 the program sets its internal facility map to indicate that the usage domain dependency is not present. In an implementation, this may be referred to the OCDEF bit being set on. Otherwise, at 330, the facility map is set to indicate the dependency on the usage domain is present. In an implementation, this may be referred to the OCDEF bit being set off.

At 315, if the program finds at least one ADM bit not set and the corresponding AQM bit set, then only the usage domain enabled feature bit is set to indicate that the usage domain without the control domain enablement pair is present (335). Otherwise, on the usage domain enabled feature bit is set to zero to indicate that the usage domain without the control domain enablement pair is not present (340).

At 320, if the program finds at least one AQM field bit set to one (enabled) and the corresponding ADM field bit set to one (enabled), then both usage and control domain enabled feature bit is set to one to indicate that both usage domain and control domain enablement pair is present (345). Otherwise, both usage and control domain enabled feature bit is set to one to indicate that both usage domain and control domain enablement pair is not present (350).

Figure 4:
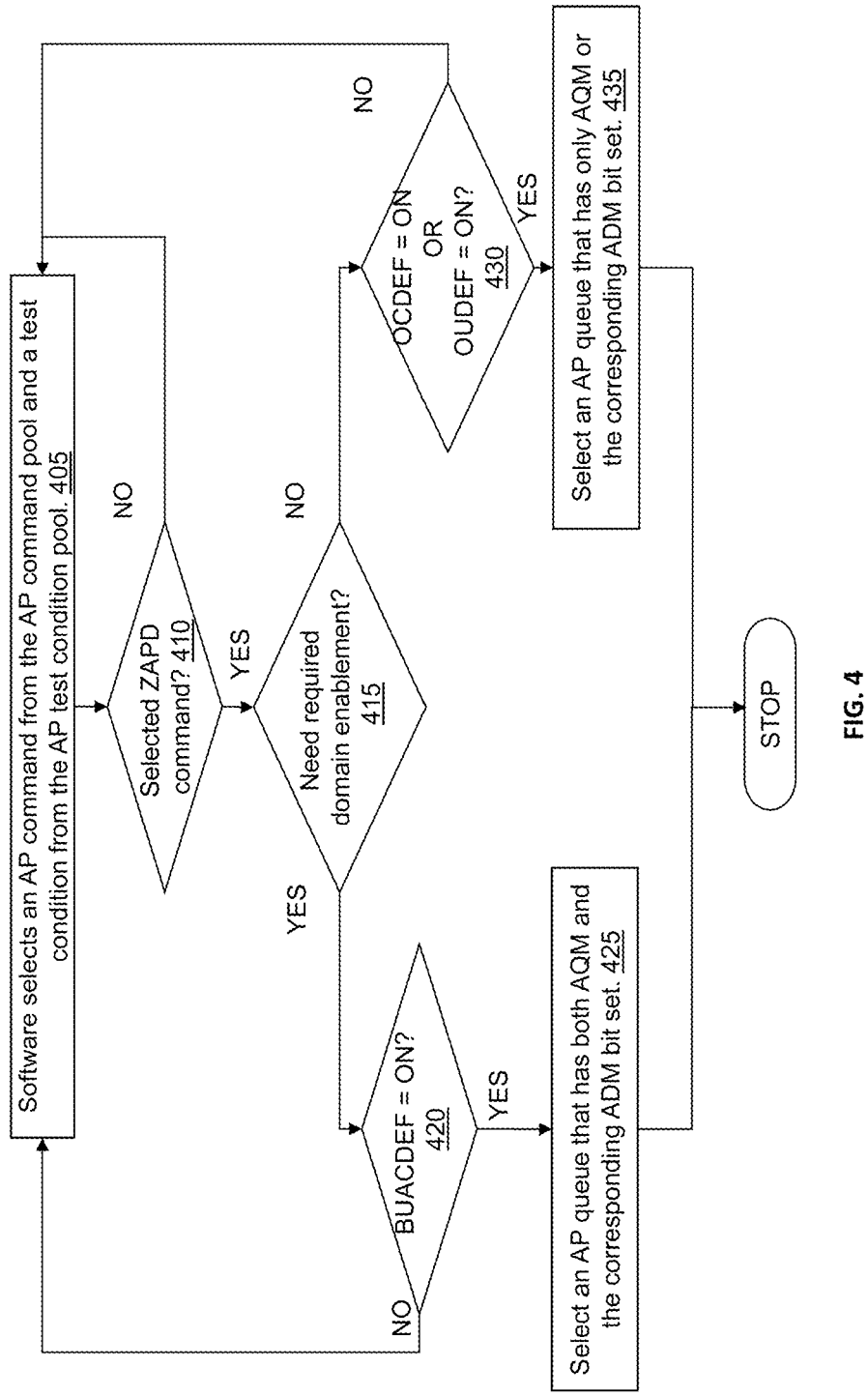
FIG. 4 illustrates a flow of generating a test case based on the software domain feature bits setting, according to one or more aspects of the present invention.

FIG. 4 illustrates a more detailed flow of 225 of FIG. 2, generating a test case based on the software domain feature bits setting.

At 405, the program selects an AP crypto card command. As previously discussed, the command may be issued by an application or operating system during the normal course of execution logic. This example uses the case of a test verification application issuing a ZAPD (zeroize AP domain) command to illustrate the flow of FIG. 4 (410). The ZAPD command is used to reset an AP domain and clear the domain's security keys, and therefore is a destructive command that requires a control domain.

At 410, the command is bypassed if it is not the selected command, e.g., here the ZAPD. At 415, the program checks its internal facility map for an indication on whether domain enablement is needed for this command. If so, at 420 the program checks if both the control domain and usage domain bits are set. If, at 420 both control domain and usage domain bits are set, then at 425, the program selects, as a target for the instruction, an AP queue having both the AQM and corresponding ADM bit set. At 415, if domain enablement is not needed, then at 430, the program selects, as a target for the instruction, an AP queue having either the control domain (ADM) or usage domain (AQM) bit set (435).

Figure 5:
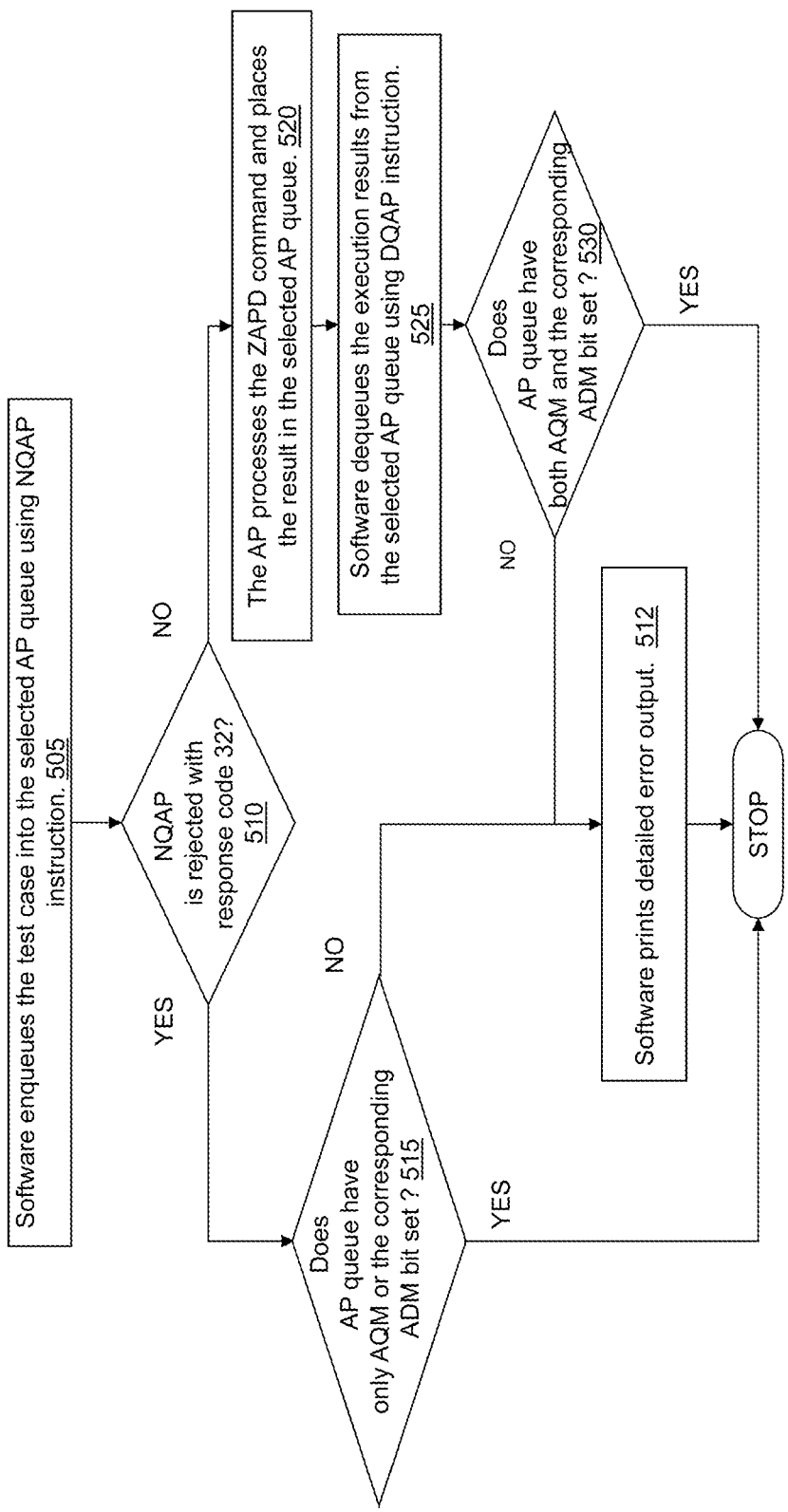
FIG. 5 illustrates a flow of executing and simulating a test case based on the software domain feature bits setting, according to one or more aspects of the present invention.

FIG. 5 illustrates a detailed flow of 230-240 of FIG. 2, executing and simulating a test case based on the software domain feature bits setting.

At 505, the program executes the NQAP instruction to enqueue the test case into the selected AP queue.

At 510, the program receives the execution results of the NQAP instruction which includes a response code and may indicate an error code, such as response code 32 (Inconsistent Command Code Attribute). If an NQAP error is indicated, NQAP execution is terminated and the AP request message is not placed in the selected AP queue.

If the NQAP instruction is rejected, then at 515 the program checks the facility bits settings of the AP crypto queue to see if only the AQM or the corresponding ADM bit is set.

If only the AQM or ADM bit is set for the AP crypto queue, then the NQAP instruction should not be executed successfully based on the ZAPD architecture, as expected by the simulator; otherwise, at 512 an error condition is noted in any one or combination of a printed error report, error log, an alert to the administrator.

Returning to 510, if the NQAP instruction is not rejected, at 520 the AP crypto card firmware processes the ZAPD command and places the result in the target AP queue.

At 525, the program dequeues the execution results using the DQAP instruction.

At 530, the program checks the facility bits settings of the AP crypto queue to see if both the AQM and the corresponding ADM bit is set. If so, then the command is executed successfully based on the ZAPD architecture, as expected by the simulator; otherwise, at 512 an error condition is noted in any one or combination of a printed error report, error log, an alert to the administrator.

Figure 6:
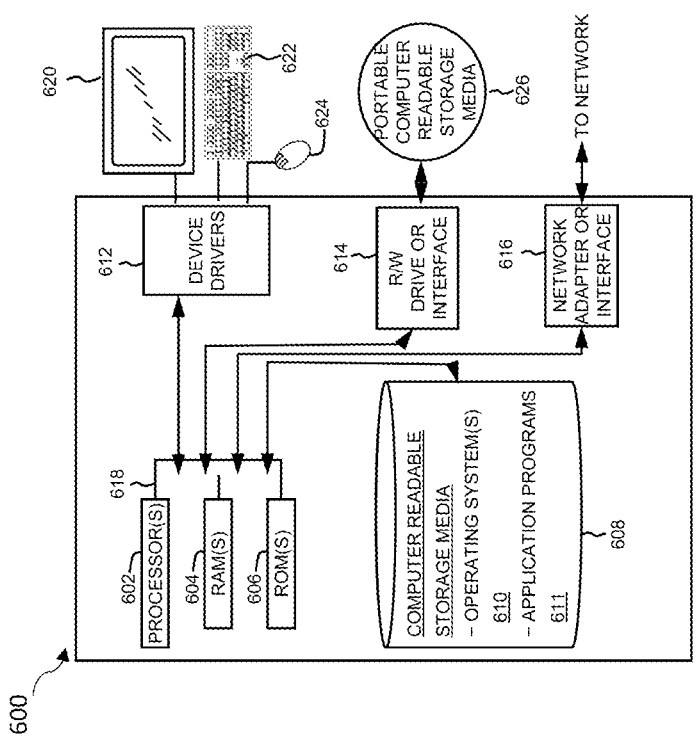
FIG. 6 illustrates a block diagram of an embodiment of a computer system or cloud server in which the present invention may be implemented.

FIG. 6 depicts a block diagram of components of a computing system 600 in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, such as the featureless machine verification and test 110, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 614 to read from and write to one or more portable computer readable storage media 626. Application programs 611 on the computing system can be stored on one or more of the portable computer readable storage media 626, read via the respective R/W drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (for example, the Internet, a local area network or other wide area networks or wireless networks) and network adapter or interface 616. From the network adapter or interface 616, the programs may be loaded into the computer readable storage media 608. The network may comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614, and network adapter or interface 616 can comprise hardware and software stored in computer readable storage media 608 and/or ROM 606.

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable AP commands thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method, comprising:
    querying, by a program, for an indicator of a dependency between a usage domain and a control domain in a virtual machine (VM) configuration having a cryptographic AP adapter, wherein the VM and the cryptographic AP adapter are both installed on a hardware server, and setting a program internal bitmap based on a result;
    generating, by the program, one or more sets of AP commands, based on the setting of the internal bitmap, wherein the sets of AP commands are directed to an adjunct processor (AP) message queue on a cryptographic AP in the VM configuration;
    enqueuing, by the program, the one or more sets of AP commands to the VM having an identifier corresponding to an offset in the program internal bitmap; and
    receiving, by the program, a status at a completion of the one or more sets of AP commands from the VM having the cryptographic AP in the VM configuration.

2. The method of claim 1, further comprising:
    executing, by a simulator or an emulator, the generated one or more sets of AP commands;
    comparing the status at the completion of the one or more sets of AP commands from the VM to the execution results of the simulator; and
    in response to there being a miscompare, alerting that the one or more sets of AP commands is in error.

3. The method of claim 1, wherein upon initialization of the server, a hypervisor indicates in the usage domain bitmap and in the control domain bitmap whether a dependency exists for the VM having the identifier corresponding to the offset in the hypervisor domain bitmaps and in the hypervisor control domain bitmap.

4. The method of claim 1, wherein the program queries both the usage domain bitmap and the control domain bitmap in parallel.

5. The method of claim 1, wherein the control domain is a cryptographic domain for which remote secure administration functions can be established and administered.

6. The method of claim 1, wherein functional commands are executed through the usage domain.

7. The method of claim 1, wherein the AP message queues are stored in a hardware system area of computer system memory, and wherein the AP message queues are directly accessible only by the OS and by the cryptographic AP.

8. A computer program product, the computer program product comprising a non-transitory tangible storage device having program code embodied therewith, the program code executable by a processor of a computer to perform a method, the method comprising:

querying, by a program, for an indicator of a dependency between a usage domain and a control domain in a virtual machine (VM) configuration having a cryptographic AP adapter, wherein the VM and the cryptographic AP adapter are both installed on a hardware server, and setting a program internal bitmap based on a result;

generating, by the program, one or more sets of AP commands, based on the setting of the internal bitmap, wherein the sets of AP commands are directed to an adjunct processor (AP) message queue on a cryptographic AP in the VM configuration;

enqueuing, by the program, the one or more sets of AP commands to the VM having an identifier corresponding to an offset in the program internal bitmap; and receiving, by the program, a status at a completion of the one or more sets of AP commands from the VM having the cryptographic AP in the VM configuration.

9. The computer program product of claim 8, further comprising:

executing, by a simulator or an emulator, the generated one or more sets of AP commands;

comparing the status at the completion of the one or more sets of AP commands from the VM to the execution results of the simulator; and in response to there being a miscompare, alerting that the one or more sets of AP is in error.

10. The computer program product of claim 8, wherein upon initialization of the server, a hypervisor indicates in the usage domain bitmap and in the control domain bitmap whether a dependency exists for the VM having the identifier corresponding to the offset in the hypervisor domain bitmaps and in the hypervisor control domain bitmap.

11. The computer program product of claim 8, wherein the program queries both the usage domain bitmap and the control domain bitmap in parallel.

12. The computer program product of claim 8, wherein the control domain is a cryptographic domain for which remote secure administration functions can be established and administered.

13. The computer program product of claim 8, wherein functional commands are executed through the usage domain.

14. The computer program product of claim 8, wherein the AP message queues are stored in a hardware system area of computer system memory, and wherein the AP message queues are directly accessible only by the OS and by the cryptographic AP.

15. A computer system, the computer system comprising:

one or more processors;

a memory coupled to at least one of the processors;

a set of computer program instructions stored in the memory and executed by at least one of the processors in order to perform actions of:

querying, by a program, for an indicator of a dependency between a usage domain and a control domain in a virtual machine (VM) configuration having a cryptographic AP adapter, wherein the VM and the cryptographic AP adapter are both installed on a hardware server, and setting a program internal bitmap based on a result;

generating, by the program, one or more sets of AP commands, based on the setting of the internal bitmap, wherein the sets of AP commands are directed to an adjunct processor (AP) message queue on a cryptographic AP in the VM configuration;

enqueuing, by the program, the one or more sets of AP commands to the VM having an identifier corresponding to an offset in the program internal bitmap; and receiving, by the program, a status at a completion of the one or more sets of AP commands from the VM having the cryptographic AP in the VM configuration.

16. The computer system of claim 15, further comprising:

executing, by a simulator or an emulator, the generated one or more sets of AP;

comparing the status at the completion of the one or more sets of AP commands from the VM to the execution results of the simulator; and in response to there being a miscompare, alerting that the one or more sets of AP commands is in error.

17. The computer system of claim 15, wherein upon initialization of the server, a hypervisor indicates in the usage domain bitmap and in the control domain bitmap whether a dependency exists for the VM having the identifier corresponding to the offset in the hypervisor domain bitmaps and in the hypervisor control domain bitmap.

18. The computer system of claim 15, wherein the program queries both the usage domain bitmap and the control domain bitmap in parallel.

19. The computer system of claim 15, wherein the control domain is a cryptographic domain for which remote secure administration functions can be established and administered, and wherein functional commands are executed through the usage domain.

20. The computer system of claim 15, wherein the AP message queues are stored in a hardware system area of computer system memory, and wherein the AP message queues are directly accessible only by the OS and by the cryptographic AP.

\* \* \* \* \*